Nov. 24, 1964     D. J. HARRINGTON     3,158,240
FULL PHASE REGENERATIVE SYNCHRONIZER CLUTCH
Filed Feb. 5, 1962     2 Sheets-Sheet 1
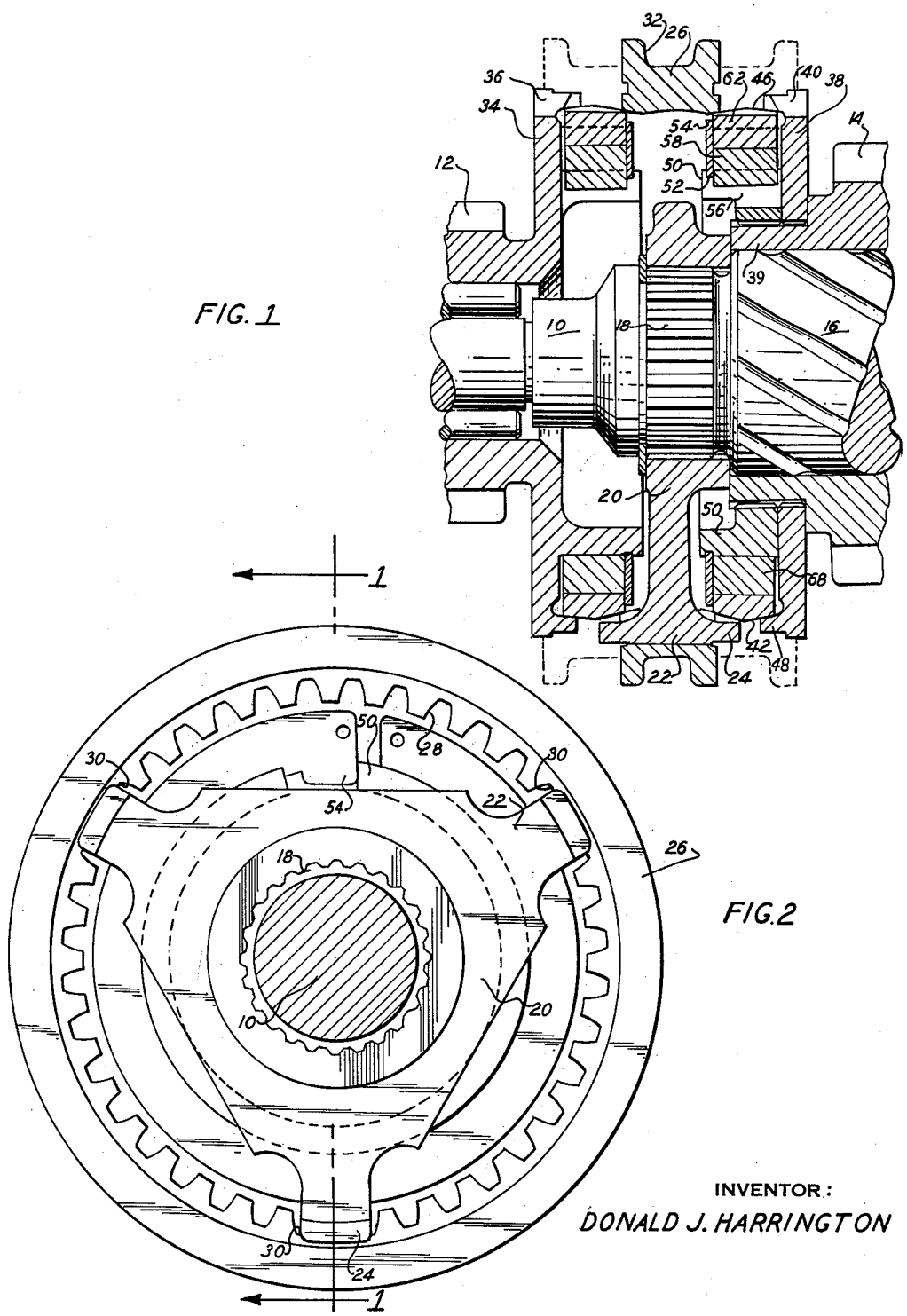
INVENTOR:
DONALD J. HARRINGTON

INVENTOR:
DONALD J. HARRINGTON 3,158,240
FULL PHASE REGENERATIVE SYNCHRONIZER CLUTCH
Donald J. Harrington, Beverly Hills, Mich., assignor to Ford Motor Company, Dearborn, Mich., a corporation of Delaware
Filed Feb. 5, 1962, Ser. No. 171,222
5 Claims. (Cl. 192—53)

My invention relates generally to a clutch mechanism capable of establishing a driving connection between two rotatable torque delivery members. More particularly, my invention relates to a synchronizer clutch structure adapted to establish a releasable driving connection between two rotary members of a power transmission mechanism.

The improvement of my invention can be applied readily to multiple speed ratio power transmission mechanisms for controlling the relative motion of the gear elements to establish and interrupt selectively the torque delivery paths, each path being characterized by a different gear ratio. In the embodiment I have disclosed, portions of the power delivery paths are defined by a torque delivery shaft and two companion gear elements. These gear elements are journaled for rotation about the axis of the shaft. The clutch structure of my invention is capable of establishing selectively a driving connection between the shaft and either of the two gear elements. Gear ratio shifts are accomplished in this fashion.

A separate clutch is provided for each gear element. Each clutch is capable of establishing synchronism between the shaft and the associated gear element before it locks them together in driving relationship.

The synchronizing action is accomplished by means of a split synchronizer ring that is engaged frictionally on its periphery by an axially shiftable clutch element as the latter is urged into clutching engagement with a cooperating clutch element carried by one of the gears. The shiftable clutch element may be nonrotatably carried by the shaft. Tangentially directed friction forces on the synchronizer ring are established if relative motion exists between the shaft and the associated gear. These forces are transmitted by the synchronizer ring to the gear if the gear is rotating slower than the shaft, or to the shaft if the shaft is rotating slower than the gear.

The means for transferring these friction forces includes arcuately shaped thrust elements disposed within the synchronizer ring. These elements tend to deform during the synchronizing operation and exert outwardly directed forces upon the synchronizer ring thus tending to expand its radial dimension. This action augments the friction forces acting upon the periphery of the ring due to the shifting action of the shiftable clutch element.

I prefer to refer to this augmentation in the effective synchronizing effort as a regenerative action. It reduces the degree of effort that is required to shift the shiftable clutch element during operation of the synchronizer clutch structure. It reduces also the duration of the shift time interval. This latter characteristic, as well as the improved cushioning action of the synchronizer mechanism, reduces or eliminates harshness in the shifts between gear ratios and prevents clashing of gear or clutch teeth during a shift.

The provision of a synchronizer clutch of the type set forth in the foregoing paragraphs being a principal object of my invention, it is a further object of my invention to provide an improved synchronizer clutch that is capable of providing a maximum degree of regenerative action during operation.

It is a further object of my invention to provide a synchronizer mechanism that employs a split synchronizer ring that is subjected to tangential friction forces during operation, wherein provision is made for augmenting to a maximum degree these forces to establish synchronism between the associated relatively movable clutch elements in a reduced time interval.

It is a further object of my invention to provide a clutch mechanism of the type above set forth wherein the friction forces acting upon the synchronizer ring are transferred to an associated clutch element through yieldable torque transmitting members that establish radially directed reaction forces upon the synchronizer ring to augment the synchronizing forces.

It is a further object of my invention to provide a synchronizer clutch mechanism of the type above set forth wherein the radially directed forces acting upon the synchronizer ring are applied to the ring throughout substantially the entire arcuate extent of the ring.

It is a further object of my invention to provide a synchronizer clutch structure of the type above set forth wherein several components are interchangeable with conventional clutch structure.

Further objects and features of my invention will become apparent from the following description and from the accompanying drawings, wherein:

FIGURE 1 is a cross sectional assembly view of a portion of a gear system employing the synchronizer clutch mechanism of my invention. It is taken along section line 1—1 of FIGURE 2;

FIGURE 2 is a transverse cross sectional view of the mechanism of FIGURE 1. It is taken along section line 2—2 of FIGURE 4;

Figure 3:
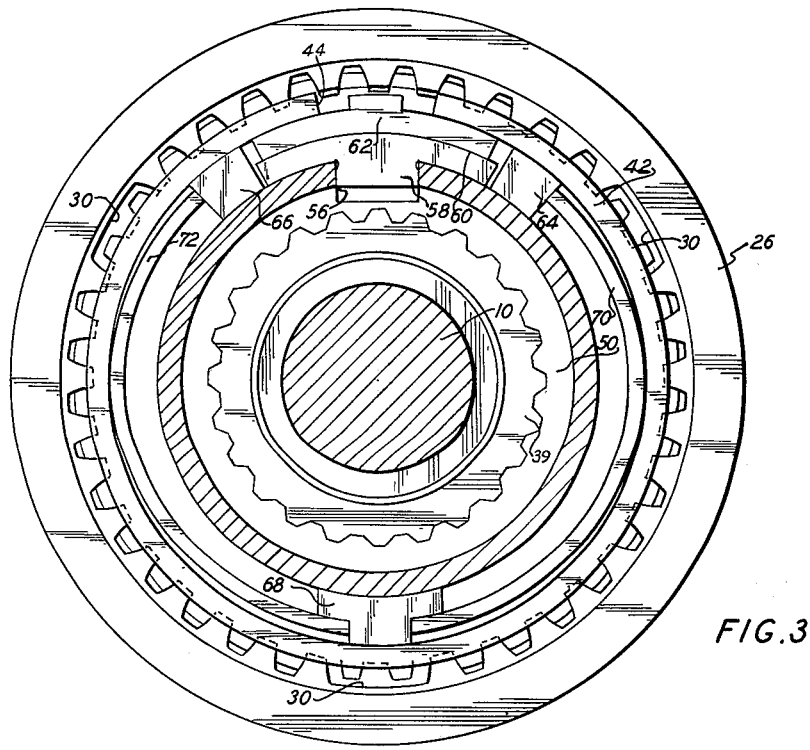
FIGURE 3 is a view similar to FIGURE 2 although it includes portions that have been omitted from the view of FIGURE 2.

Referring first to FIGURE 1, numeral 10 designates a torque delivery shaft for a multiple speed power transmission mechanism. Numeral 12 identifies a first gear that forms a part of a torque delivery path. Numeral 14 designates another gear in the torque delivery gear train. Gear 14 is journaled upon a relatively large diameter portion 16 of the shaft 10. This portion 16 includes lubricating oil grooves, as indicated, to permit free relative rotation of gear 14 with respect to the portion 16.

Shaft 10 includes also a splined portion 18 to which is secured an internally splined hub or pilot member 20. Member 20 includes radially extending arms 22. The radially outward portions of the arms 22 are formed with axially extending extensions 24.

A clutch sleeve 26 having internal clutch teeth 28 is positioned upon the pilot member 20. It is formed with recesses in the toothed inner periphery thereof to accommodate the extensions 24. These recesses are indicated in FIGURE 3 by reference numeral 30.

The sleeves 26 can be formed with a peripheral groove 32 to accommodate a shifter fork, not shown, that in turn can be actuated manually in a conventional fashion. The sleeve element 26 thus can be shifted axially as indicated in FIGURE 1 to the positions shown by means of dotted lines.

Gear 12 is connected integrally to a radially extending clutch element 34 having external clutch teeth 36. Similarly, a clutch element 38 is associated with gear 14. By preference, it is internally splined to facilitate a splined connection with an externally splined extension 39 of the gear 14. Clutch element 38 is formed with clutch teeth 40.

The teeth 36 and 40 are adapted to engage drivably teeth 28 of the sleeve element 26 when the latter is shifted in a right-hand direction or a left-hand direction as viewed in FIGURE 1. This action establishes a driving connection between shaft 10 and one or the other of the gears 12 or 14.

A synchronizer clutch mechanism is associated with each of the gears 12 and 14 to establish synchronism between shaft 10 and each of the associated gears 12 or 14 prior to clutching engagement of the sleeve 26 with the teeth 36 or 40. These synchronizer clutch mechanisms are substantially the same and therefore only one of them will be described.

Figure 4:
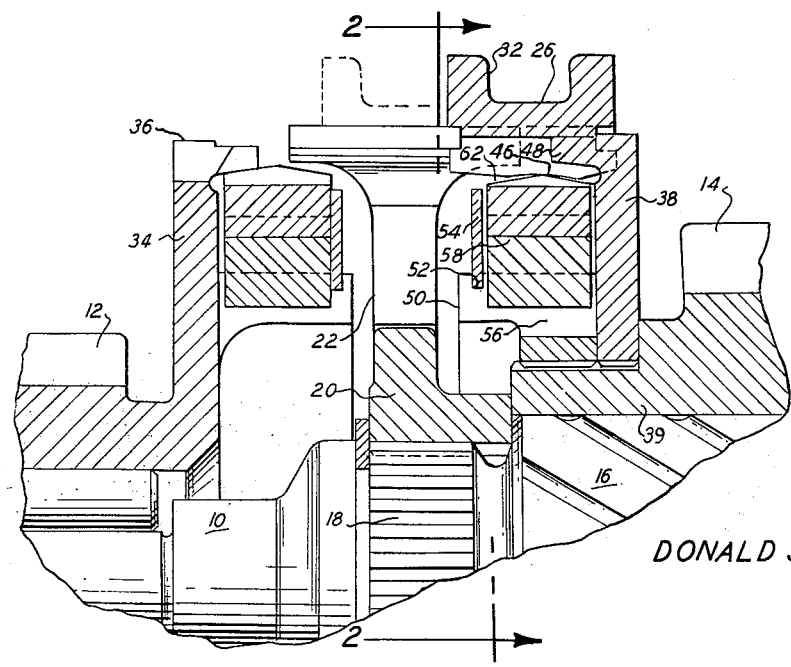
FIGURE 4 is an enlarged cross sectional view showing a portion of the structure of FIGURE 1 with the shiftable clutch element in a clutching position.

Referring next to FIGURES 2 and 4, a split synchronizer ring is identified by reference character 42. This ring is formed with a gap 44 and with a crowned or raised outer periphery 46.

The teeth 40 are formed with a shoulder 48 that overlies the periphery 46. Thus, the ring 42 is held in place by the shoulders 48 and is maintained in concentric disposition with respect to the axis of shaft 10. Ring 42 also may be prestressed and held in a stressed position after assembly by the shoulders 48.

A synchronizer hub 50 is internally splined to the extension 39 of the gear 14. It is formed with a snap ring groove 52 within which is fitted a releasable snap ring 54. The snap ring 54 prevents axial movement of the synchronizer ring 42.

The member 50 is formed with a notch 56. An abutment member 58 includes a depending portion that is received within notch 56. The radially outward convex surface 60 of the member 58 is formed arcuately, the center of curvature of the surface 60 being concentric with respect to the axis of the shaft 10. Another abutment member is shown at 62 and includes a radially extending portion that is situated between the ends of the synchronizer ring 42 within the gap 44. This member 62 is formed with a concave surface of the same curvature as the surface 60. It is movable relative to the member 58 in a tangential direction.

A thrust element 64 is disposed within the ring 42. This element 64 is adapted to move tangentially with respect to the synchronizer ring 42 and may be formed with arcuate inner and outer surfaces that register with the curved outer surface of member 50 and the curved inner surface of the synchronizer ring 42. Another thrust element 66 is situated on the other arcuate side of the members 58 and 62 within the synchronizer ring 42.

An anchor member 68 is disposed within the ring 42 at a location substantially 180 degrees out of phase with respect to the members 58 and 62. This member is formed with arcuate inner and outer surfaces that register with the curved outer surface of the member 50 and the curved inner surface of the ring 42.

An arcuately shaped spring segment 70 is located within the synchronizer ring 42 between the thrust element 64 and the anchor member 68. This arcuate segment 70 engages the inner periphery of the ring 42. In a relaxed condition, the radius of curvature of the segment 70 may be less than the radius of curvature of the ring 42 although it engages the ring 42 throughout a relatively large arcuate distance as will be explained subsequently.

Another arcuately shaped spring segment 72 is disposed between thrust element 66 and anchor member 68. This corresponds in position and function to the spring element 70.

During operation of the mechanism, the teeth 28 of the clutch sleeve 26 engage the outer periphery of the ring 42 when it is moved toward a clutching position. This is shown in FIGURE 4. If the shaft 10 and the sleeve element 26 are rotating faster than the gear 14, tangential friction forces will be established upon the ring 42. This will cause a shifting of the ring 42 in a clockwise direction as viewed in FIGURE 3. One end of the ring 42 thus will engage the member 62 and cause the latter to engage in turn the element 64. The tangential thrust thus imparted to the element 64 is transferred to anchor member 68 through the arcuate spring segment 70. The reaction force upon the anchor member 68 then is transferred through arcuate segment 72 to the thrust element 66 that in turn engages one end of the anchor member 58. The member 58 in turn transfers the tangential forces to the member 50 and the gear 14. The gear 14 thus is accelerated relative to the shaft 10, and when it is brought into synchronism the clutch sleeve 26 can be moved to the clutching position shown in FIGURE 4 without any clashing.

The tangential thrust that is distributed through the segments 70 and 72 causes them to move in a radial direction thus exerting a radially outward force upon the synchronizer ring 42. This force in turn establishes an augmented friction force in a tangential direction upon the outer periphery of the ring 42. This results in turn in an augmented synchronizing force that is distributed to the gear 14 in the manner previously described. When the spring segments 70 and 72 transmit tangential forces, their ends may move radially outward along the abutting radial surface of the thrust elements 64 and 66, respectively. Thus, each of these arcuate spring segments will engage the synchronizer clutch ring throughout a relatively large arcuate extent when they are deformed.

The forces distributed through the segment 70 to the anchor member 68 will result in an equal reaction force in segment 72. This reaction force likewise causes a radial pressure upon the synchronizer clutch ring 42 throughout a large arcuate extent. As a result, a relatively large degree of regenerative effort is provided. This is unlike split ring synchronizer constructions of known design. This so-called full phase regenerative effort results from a balance distribution of circumferentially spaced radial forces upon the inner periphery of the split synchronizer ring 42 during the synchronizing operation.

The tangential tolerance allowed between the members 58 and 62 and the associated thrust elements 64 and 66 will insure that the element 66 will engage the element 58 whenever the element 62 is moved into engagement with element 64. Conversely, the element 64 will always engage element 58 whenever element 62 engages element 66. If desired, the tangential dimension of the element 62 can be made less than the tangential dimension of the element 58.

A relatively large degree of lost motion between the synchronizer ring 42 and the member 62 is provided in order to permit alignment of the clutch teeth when the sleeve 26 is moved into clutching engagement with the teeth 36 or 40 when the shaft 10 is stationary and the associated gear is stationary. This eliminates an undesirable blocking action of the clutch teeth since limited relative movement of the teeth of clutch element 26 with respect to teeth 36 or 40 can be accommodated just prior to engagement thereof.

Having thus described a preferred embodiment of my invention, what I claim and desire to secure by United States Letters Patent is:

1. A synchronizer clutch mechanism capable of establishing a driving connection between two torque delivery members that are mounted for rotation about a common axis, a clutch sleeve carried by one of said members, said sleeve being adapted to shift axially, internal clutch teeth formed on said sleeve, external clutch teeth carried by the other of said members, said internal teeth being engageable with said external teeth upon shifting movement of said sleeve in one direction, a synchronizer ring disposed adjacent said external teeth said ring being split to define two juxtaposed ends, the periphery of said ring being situated in the path of shifting movement of said internal teeth and engageable therewith when said sleeve is shifted in said one direction to establish tangential friction forces, a first abutment element having a portion disposed between the ends of said ring, a second abutment element fixedly connected to said other member, said abutment elements being disposed at the same angular position with respect to said axis, an anchor member disposed within said ring at a location that is substantially 180 degrees away from said abutment elements with respect to the common axis of said members, said anchor member being tangentially slidable upon said other member and means for distributing tangential friction forces from said ring to said other member including a pair of resilient arcuate segments located within said ring, one end of each segment being engageable with said anchor member, each arcuate segment being adapted to exert a radial pressure upon the inner periphery of said ring during operation when it yields under the influence of end forces acting thereon.

2. A synchronizer clutch mechanism including a pair of engageable clutch elements capable of establishing a driving connection between a driving member and a driven member that are mounted for rotation about a common axis, said driving member being connected to one clutch element, said driven member being connected to the other clutch element, a synchronizer ring disposed adjacent said other clutch element, said ring being split to define two juxtaposed ends, the periphery of said ring being frictionally engageable with said one clutch element upon movement of the latter toward said other clutch element, a first abutment member having a portion disposed between the ends of said ring, a second abutment member engageable with said first abutment member and shiftable tangentially relative thereto, means for connecting said second abutment member to said driven member, a floating anchor member disposed within said ring and adapted for relative tangential shifting movement with respect to said ring, and a pair of resilient arcuate thrust transmitting elements disposed within said ring, one end of each thrust transmitting element being engageable with said anchor member, the frictional tangential forces acting upon said ring being transmitted to said driven member through each abutment and through each arcuate thrust transmitting element, said thrust transmitting elements being adapted to yield and exert balanced radial forces upon the inner periphery of said ring at tangentially spaced locations.

3. A synchronizer clutch mechanism including a pair of engageable clutch elements capable of establishing a driving connection between a driving member and a driven member that are mounted for rotation about a common axis, said driving member being connected to one clutch element, said driven member being connected to the other clutch element, a synchronizer ring disposed adjacent said other clutch element, said ring being split to form juxtaposed ends, the periphery of said ring being frictionally engageable with said one clutch element upon movement of the later toward said other clutch element, a first abutment member having a portion disposed between the ends of said ring, a second abutment member engageable with said first abutment member and shiftable tangentially relative thereto, means for connecting said second abutment member to said driven member, a floating anchor member disposed within said ring and adapted for relative tangential shifting movement with respect to said ring, a pair of resilient arcuate thrust transmitting elements disposed within said ring, one end of each thrust transmitting element being engageable with said anchor member, the frictional tangential forces acting upon said ring being transmitted to said driven member through each abutment and through each arcuate thrust transmitting element, said anchor member being displaced substantially 180 degrees away from said abutment members with respect to said common axis, and separate thrust members situated within said ring between the other end of each arcuate thrust transmitting element and said abutment members, one thrust member engaging said first abutment member and the other thrust member engaging the said second abutment member during operation, said thrust transmitting elements being adapted to yield and exert radial pressure upon the inner periphery of said ring to establish regenerative synchronizing forces.

4. A synchronizer clutch mechanism comprising a shiftable clutch sleeve, internal clutch teeth formed on said sleeve, a clutch element having external clutch teeth, said clutch mechanism being adapted to establish a driving connection between a driving and a driven member that are mounted for rotation about a common axis, one of said members being connected to said sleeve and the other of said members being connected to said clutch element, a synchronizer ring disposed adjacent said clutch element, said ring being split to define two juxtaposed ends, the periphery of said ring being frictionally engageable with said internal clutch teeth as said sleeve is shifted toward said clutch element, a first abutment having a portion disposed between the ends of said ring, a second abutment engageable with said first abutment and shiftable tangentially relative thereto, means for connecting said second abutment to said other member, a floating anchor disposed within said ring and adapted for tangential shifting movement with respect to said ring, a pair of flexible arcuate thrust transmitting elements disposed within said ring, one end of each thrust transmitting element being engageable with said anchor, said anchor being located substantially 180 degrees away from said abutments with respect to said common axis, a pair of thrust members located within said ring, a separate one of said thrust members being situated between the other end of each thrust transmitting member and said abutments, said first abutment being engageable with one of said thrust members and the second abutment being engageable with the other thrust member during operation, each arcuate thrust transmitting element being adapted to exert simultaneously a radial pressure upon the inner periphery of said ring whereby regenerative synchronizer forces are established.

5. A synchronizer clutch mechanism capable of establishing a driving connection between two torque delivery members that are mounted for rotation about a common axis, a shiftable clutch sleeve carried by one of said members, internal clutch teeth formed on said sleeve, external clutch teeth carried by the other of said members, a synchronizer ring disposed adjacent said external teeth, said ring being split to define two juxtaposed ends, the periphery of said ring being situated in the path of movement of said internal teeth whereby tangential friction forces are established on said ring as said sleeve is shifted over said ring, a first abutment element having a portion disposed between the ends of said ring, a second abutment element fixedly connected to said other member, said abutment elements being disposed at the same angular position with respect to said common axis, an anchor member disposed within said ring at a location that is substantially 180 degrees away from said abutment elements with respect to said common axis, a pair of resilient arcuate segments located within said ring, one end of each segment being engageable with said anchor member, a pair of thrust members located within said ring, one of said thrust members being located between said first abutment element and the other end of one arcuate element, and the other thrust member being located between the other end of the other arcuate element and the second abutment element, one thrust member being engageable with said first abutment element and the other thrust member being engageable with the second abutment element during operation, said arcuate segments being simultaneously yieldable during operation whereby a radial pressure is exerted by each of them upon the inner periphery of said ring.

References Cited by the Examiner

UNITED STATES PATENTS 1,511,232  10/24  Murray.
2,932,373  4/60   Schmid.

FOREIGN PATENTS 209,580  8/57  Australia.
925,083  3/55  Germany.

DAVID J. WILLIAMOWSKI, *Primary Examiner.*

THOMAS J. HICKEY, *Examiner.*